(12) United States Patent
Conor et al.

(10) Patent No.: US 10,514,696 B2
(45) Date of Patent: Dec. 24, 2019

(54) NAVIGATION DRIVING METRIC

(71) Applicant: HERE GLOBAL B.V., Eindhoven (NL)

(72) Inventors: Digan Conor, Chicago, IL (US); Toby Tennent, Chicago, IL (US); James Fowe, Chicago, IL (US); Filippo Pellolio, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/656,499

(22) Filed: Jul. 21, 2017

(65) Prior Publication Data

US 2019/0025837 A1    Jan. 24, 2019

(51) Int. Cl.
| | |
|---|---|
| *G05D 1/02* | (2006.01) |
| *G08G 1/01* | (2006.01) |
| *G05D 1/00* | (2006.01) |
| *G01S 19/13* | (2010.01) |

(52) U.S. Cl.
CPC ......... *G05D 1/0214* (2013.01); *G05D 1/0088* (2013.01); *G05D 1/0274* (2013.01); *G05D 1/0278* (2013.01); *G08G 1/012* (2013.01); *G08G 1/0112* (2013.01); *G08G 1/0129* (2013.01); *G01S 19/13* (2013.01); *G05D 2201/0213* (2013.01)

(58) Field of Classification Search
CPC ...... G08G 1/0129; G08G 1/012; G01S 19/13; G05D 1/0214; G05D 1/0274; G05D 1/0088; G05D 1/0278; G05D 2201/0213
See application file for complete search history.

(56) References Cited

U.S. PATENT DOCUMENTS

| | | | |
|---|---|---|---|
| 6,385,539 B1 * | 5/2002 | Wilson | G01C 21/30 340/905 |
| 6,581,005 B2 * | 6/2003 | Watanabe | G01C 21/30 340/988 |
| 9,165,477 B2 | 10/2015 | Wilson | |
| 9,587,951 B1 * | 3/2017 | Hamida | G01C 21/32 |
| 10,120,381 B2 * | 11/2018 | Thakur | G05D 1/0088 |

(Continued)

FOREIGN PATENT DOCUMENTS

| | | |
|---|---|---|
| WO | WO2016/088375 A1 | 6/2016 |
| WO | WO 2016/151554 A1 | 9/2016 |

OTHER PUBLICATIONS

Extended European Search Report for Application No. 170780EP dated Dec. 14, 2018, 8 pages.

(Continued)

*Primary Examiner* — Tyler J Lee
(74) *Attorney, Agent, or Firm* — Alston & Bird LLP

(57) ABSTRACT

A method is disclosed comprising: obtaining data associated with each road segment of at least one road segment, said data comprising: a representative of at least one link associated with the respective road segment; obtaining probe data associated with the respective road segment, the probe data comprising: at least one piece of position information; determining a sinuous driving metric, which is a value being indicative of a sinuosity of driving on the respective road segment based at least partially on the probe data and its allocation with respect to the respective road segment. It is further disclosed an according apparatus, computer program and system.

22 Claims, 11 Drawing Sheets

0 SDM 0.8 SDM

(56) References Cited

U.S. PATENT DOCUMENTS

| | | | |
|---|---|---|---|
| 2001/0029425 A1* | 10/2001 | Myr | G01C 21/3492 |
| | | | 701/117 |
| 2002/0065603 A1* | 5/2002 | Watanabe | G01C 21/30 |
| | | | 701/446 |
| 2008/0059051 A1* | 3/2008 | Kumagai | G08G 1/0104 |
| | | | 701/117 |
| 2008/0136670 A1* | 6/2008 | Tengler | G08G 1/20 |
| | | | 340/905 |
| 2009/0138497 A1* | 5/2009 | Zavoli | G09B 29/106 |
| 2010/0036599 A1 | 2/2010 | Froeberg et al. | |
| 2011/0060495 A1* | 3/2011 | Kono | G01C 21/3469 |
| | | | 701/31.4 |
| 2011/0301802 A1* | 12/2011 | Rupp | G08G 1/0112 |
| | | | 701/408 |
| 2011/0307165 A1* | 12/2011 | Hiestermann | G01C 21/32 |
| | | | 701/119 |
| 2011/0307188 A1 | 12/2011 | Peng et al. | |
| 2012/0197839 A1* | 8/2012 | Vervaet | G01C 21/32 |
| | | | 707/609 |
| 2012/0283942 A1* | 11/2012 | T'Siobbel | G01C 21/26 |
| | | | 701/410 |
| 2014/0002277 A1* | 1/2014 | Fulger | G01C 21/3415 |
| | | | 340/905 |
| 2014/0088855 A1 | 3/2014 | Ferguson | |
| 2014/0244125 A1* | 8/2014 | Dorum | G01C 21/32 |
| | | | 701/70 |
| 2015/0029014 A1 | 1/2015 | Bande Martinez et al. | |
| 2015/0094948 A1* | 4/2015 | Lu | G01C 21/3461 |
| | | | 701/410 |
| 2016/0171521 A1 | 6/2016 | Ramirez et al. | |
| 2016/0247397 A1* | 8/2016 | Xu | G08G 1/0125 |
| 2016/0265930 A1* | 9/2016 | Thakur | G05D 1/0088 |
| 2017/0004705 A1 | 1/2017 | Fowe et al. | |
| 2017/0061793 A1* | 3/2017 | Witte | G08G 1/012 |
| 2017/0316686 A1* | 11/2017 | Verheijen | B60R 16/0236 |

OTHER PUBLICATIONS

Oh, C. et al., *Hazardous Driving Event Detection and Analysis System in Vehicular Networks (HEAVEN): Methodology and Field Implementation*, TRB Paper No. 13/0705, TRB 2013 Annual Meeting (2013) 18 pages.

\* cited by examiner

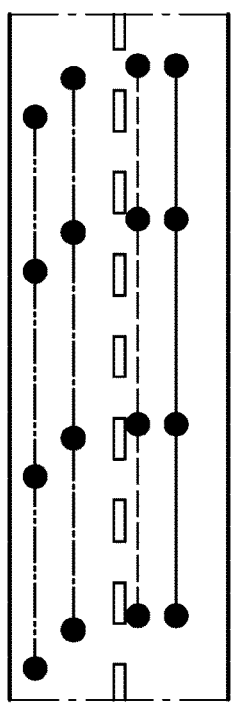 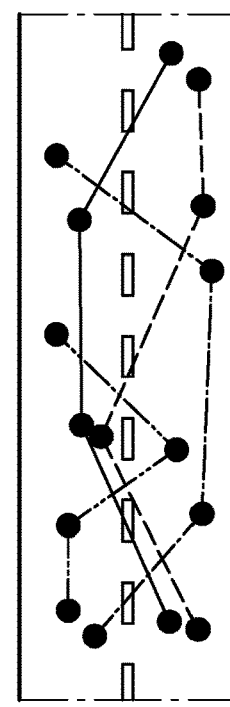
0 SDM     Fig.4     0.8 SDM
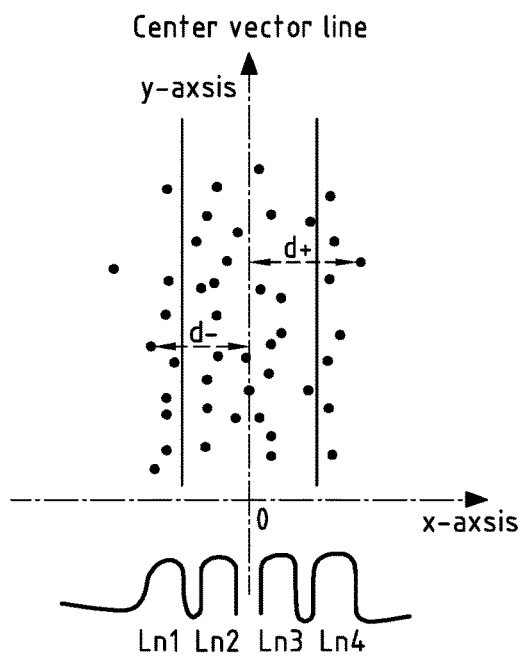
Histogram showing multimodality in Spatial Pattern VLP
Fig.5

0 Lateral Movement    2m Lateral Movement

NAVIGATION DRIVING METRIC

FIELD

The following disclosure relates to the field of providing safety data related with road segments which might be used for navigation purposed, in particular of autonomous vehicles.

BACKGROUND

For autonomous vehicles to work properly, the autonomous vehicles require a full understanding of the road map and structure of roads. Further, the autonomous vehicles need to be able to use computer vision to see road signs and detect pedestrians crossing and so on in order to understand the dynamics of multi-modular traffic on road segments. The most unpredictable dynamics around autonomous vehicles are neighboring human-driven vehicles. Human-driven vehicles are often times unpredictably overtaking other cars, breaking suddenly, or executing parking maneuvers to name but a few non-limiting examples.

The artificial intelligence used for driving autonomous vehicles is designed for handling unexpected events, but less uncertainty is obviously preferable. Autonomous vehicles would prefer to e.g. avoid road segments associated with high likelihood of unexpected events.

SUMMARY

It is thus, inter alia, an object of the invention to achieve a metric for driver behavior and/or driving patterns on certain road segments, in particular having a measurable metric that describes how a driving style (e.g. smooth or proper or safe driving) is on road segments, e.g. which may be used as safety data related with road segments.

According to a first exemplary embodiment of the present invention, a method is disclosed, the method comprising:
  obtaining data associated with each road segment of at least one road segment, said data comprising:
    a representative of at least one link associated with the respective road segment;
  obtaining probe data associated with the respective road segment, the probe data comprising:
    at least one piece of position information; and
  determining a sinuous driving metric, which is a value being indicative of a sinuosity of driving on the respective road segment based at least partially on the probe data and its allocation with respect to the respective road segment.

This method may for instance be performed and/or controlled by an apparatus, for instance a server. Alternatively, this method may be performed and/or controlled by more than one apparatus, for instance a server cloud comprising at least two servers. Alternatively, the method may for instance be performed and/or controlled by an electronic device, e.g. a mobile terminal. For instance, the method may be performed and/or controlled by using at least one processor of the server or the electronic device.

According to a further exemplary aspect of the invention, a computer program is disclosed, the computer program when executed by a processor causing an apparatus, for instance the server, to perform and/or control the actions of the method according to the first exemplary embodiment.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the first exemplary embodiment.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, in the following also referred to as "first apparatus", comprising at least one processor and at least one memory including computer program code, the at least one memory and the computer program code configured to, with the at least one processor, cause an apparatus, for instance the apparatus, at least to perform and/or to control the method according to the first exemplary embodiment.

The above-disclosed apparatus according to any aspect of the invention may be a module or a component for a device, for example a chip. Alternatively, the disclosed apparatus according to any aspect of the invention may be a device, for instance a server or server cloud, or any other kind of electronic device, e.g. a mobile (e.g. smartphone, tablet, to name but a few non-limiting examples) or a stationary device (e.g. navigation device comprised by a vehicle, to name but one non-limiting example). The disclosed apparatus according to any aspect of the invention may comprise only the disclosed components, for instance means, processor, memory, or may further comprise one or more additional components.

According to a further exemplary aspect of the invention, a system is disclosed, comprising:
  an apparatus according to any aspect of the invention as disclosed above, and an electronic device, wherein the electronic device is configured to gather one or more pieces of probe data.

The apparatus may for instance be a server or any other kind of mobile or stationary device, and is in the following also referred to as "first apparatus". The electronic device may for instance be a mobile (e.g. smartphone, tablet, to name but a few non-limiting examples) or a stationary device (e.g. navigation device comprised by a vehicle, to name but one non-limiting example). The apparatus and the electronic device each may comprise a processor, and linked to the processor, a memory. The memory may for instance store computer program code for obtaining data associated with each road segment of at least one road segment, for obtaining probe data associated with the respective road segment, and for determining a sinuous driving metric. The processor is configured to execute computer program code stored in the memory in order to cause the apparatus and/or the electronic device to perform one or more desired actions. The memory may for instance be an example embodiment of a non-transitory computer readable storage medium, in which computer program code according to the invention may be stored.

In the following, exemplary features and exemplary embodiments of all aspects of the present invention will be described in further detail.

The method according to all aspects of the present invention may for instance be performed by at least one apparatus. The at least one apparatus may for instance be caused to perform the method according to all aspects of the present invention by at least one processor (may be one processor or a plurality of processors) and computer program code stored in at least one memory (may be one memory or a plurality of memories). The at least one apparatus that is caused to perform the operation can be the first apparatus described above, e.g. the server or the electronic device, or some other apparatus.

The at least one road segment may for instance represent a road segment that can be used for navigation purposes. For instance, a plurality of road segments of this at least one road segment may represent a part of a map or a map that may be used for navigation, in particular for vehicle/car navigation, e.g. for autonomous vehicles (AV). The obtained data may for instance be map data.

The representative of the at least one link associated with the respective road segment may for instance be indicative of the coordinates (e.g. horizontal coordinates; latitude/longitude coordinates) of the road segment, and/or the course of the road segment. The link may for instance represent the geographical position and/or length of the road segment. The course of the road segment may for instance be represented by at least two coordinates. For instance, in case the road segment is straight, the course of this road segment may for instance be represent by at least two coordinates, wherein a first coordinate may for instance be indicative of a starting point of the road segment, and a second coordinate may for instance be indicative of a finishing point of the road segment.

The probe data may for instance be obtained (e.g. gathered) by a Global Navigation Satellite System (GNSS) sensor, e.g. a Global Positioning System (GPS) sensor. The sensor may for instance be comprised by the first apparatus, and/or the electronic device. Alternatively, the sensor may for instance be connectable to the first apparatus and/or the electronic device. For instance, the first apparatus and/or the electronic device may comprise a GNSS receiver, e.g. based on signals from GPS satellites, from BeiDou satellites, from Globalnaja Nawigazionnaja Sputnikowaja Sistema (GLONASS) satellites, or form GALILEO satellites or other satellites, in order to estimate the location of the first apparatus and/or the electronic device, or the first apparatus and/or the electronic device may comprise another unit for estimating the location. The estimated location may for instance be represented by at least one piece of position information. For instance, such first apparatuses and/or electronic devices may be associated with objects moving on a respective road segment, wherein the objects may comprise bikes, and/or pedestrians and/or vehicles and/or other objects that can move on the respective road segment.

The probe data may for instance comprise one or more sets of probe data. Each of the one or more sets of probe data may for instance comprise at least one piece of position information. In case the probe data comprises more than one set of probe data, one of the more than one sets of probe data may for instance be associated with a vehicle, and one of the more than one sets of probe data may for instance be associated with another vehicle.

The at least one piece of position information may for instance be indicative of a horizontal position (e.g. horizontal coordinates; latitude/longitude coordinates). In case the at least one piece of position information comprises more than one piece of position information, such a plurality of pieces of position information may for instance be indicative of at least one trajectory representing a course (also referred to as trip) along e.g. the horizontal positions. Additionally, the at least one piece of position information may for instance comprise at least one piece of epoch time information and/or a piece of date information. The at least one piece of epoch time information may for instance be indicative of a time or time period the respective piece of position information was obtained (e.g. gathered). The piece of date information may for instance be indicative of a date at which the respective piece of position information was obtained (e.g. gathered).

The sinuous driving metric is a value being indicative of a sinuosity of driving on the respective road segment. The sinuous driving metric may for instance represent a measure of driver behavior and/or driving pattern changes that influences autonomous driving, e.g. how rough drivers drive on the respective road segment, and/or how sinuous or not sinuous drivers drive on the respective road segment. For example, if a road segment is associated with perfectly sinuous driving (e.g. the drivers on the road segment do not change lanes at all), it can be assumed that it is easy to drive on the respective road segment for an autonomous vehicle and thus the sinuous driving metric may reflect this by an appropriate value, e.g. the sinuous driving metric may be of the value 0. If a road segment is associated with driving not being sinuous (e.g. the drivers drive very aggressive e.g. by doing sudden and/or frequent lane changes), it can be assumed that it is hard to drive on the respective road segment for an autonomous vehicle and thus the sinuous driving metric may reflect his by an appropriate value, e.g. the sinuous driving metric may be of a value greater than zero, in particular up to the value of 1 or 2 representing that it is very hard to drive on the respective road segment.

The sinuous driving metric is determined based at least partially on the probe data and its allocation with respect to the respective road segment. For instance, an indication of a sinuosity of driving on the respective road segment may be in particular lane changes on the respective road segment. Thus, lateral activity of the probe data for the representative of the at least one link associated with the respective road segment may be determined. The allocation of the at least one position information comprised by the probe data with respect to the respective road segment is used for subsequently determining the sinuous driving metric. For instance, lateral movement of the probe data, along with forward movement of the probe data may for instance be determined. In case, the probe data comprises more than one pieces of position information, at least one trajectory, e.g. on a map of the more than one position information may be represented by these more than one of pieces of position information. The more than one pieces of position information may for instance form an ensemble of trajectories. For instance, a first trajectory may represent changing lanes. A second trajectory, e.g. jointly connected to the first trajectory, may for instance represent driving straight and not changing lanes. A third trajectory, e.g. jointly connected to the second trajectory, represented by the more than one pieces of position information may represent changing lanes.

Additionally, the probe data may for instance comprise more than one position information gathered by different electronic devices. These more than one position information gathered by different electronic devices may for instance each represent a trajectory of each electronic device.

For determining a metric of the average lateral activity for the representative of at least one link associated with the respective road segment, the lateral movement with respect to the respective road segment, and/or the forward movement with respect to the respective road segment may for instance be determined based at least partially on the probe data. Subsequently, the ratio between these two values may for instance be determined being indicative of the average lateral activity for the representative of the at least one link associated with the respective road segment. The higher the determined ratio is, the more this value is indicative of driving associated with the respective road segment being not sinuous, and vice versa.

Additionally, the determined ratio may for instance represent average lengths unit (e.g. meters) the probe data has been moving to the left or to the right for every length unit (e.g. meters) being moved in a forward direction. This ratio may for instance be assumed to be directly proportional to an average number of lane changes. In this way, the sinous driving metric may for instance be determined.

One or more sinuous driving metrics may for instance be associated with the representative of the at least one link. The link may comprise for instance one or more road segments. A sinuous driving metric may be associated with each of the one or more road segments. Further, one or more sinuous driving metrics may for instance be associated with one road segment. Each of the one or more sinuous driving metrics may for instance represent one driver on the respective road segment. For instance, dependent upon the time epoch and/or date the probe data has been obtained, the sinuous driving metric may for instance represent real-time information of drivers currently driving on the road segment. Alternatively, only one sinuous driving metric may for instance be associated with one road segment, e.g. representing an average of how sinuous it is driven on the respective road segment.

In this way, road segments may for instance be associated with a score based on probe data in order to estimate the probability of finding drivers on a road segment (e.g. in real-time) and rating for specific individual vehicles. In case a road segment is associated with one or more sinuous driving metrics of various drivers, an autonomous vehicle may for instance determine in real-time whether the respective road segment may be used, e.g. for navigation purposes, or not. The determined sinuous driving metric may for instance be used for roadway safety applications and/or roadway management applications, along with vehicle behavior analytics applications.

In the following, a so-called "map-matching" for determining a sinuous driving metric shall be considered to be disclosed.

In an exemplary embodiment according to all aspects of the present invention, a lane distance metric is determined based at least partially on the obtained data and the obtained probe data, wherein the lane distance metric indicates a measure of an average relative lateral movement of the at least one probe data associated with the at least one road segment.

The lane distance metric (also referred to as d-value) may for instance be indicative of the closest perpendicular distance from each of the at least one piece of position information of the probe data to the representative of at least one link associated with the respective road segment. The lane distance can be assumed as the distance of the at least one piece of position information of the probe data from the center of a road represented by the at least one link associated with the respective road segment.

The lane distance metric may for instance be determined (e.g. calculated) by using geometrical allocation of points to each other. The at least one position information and the representative of at least one link associated with the respective road segment may for instance be assumed to be points in a two-dimensional space. The spherical shape of the earth, which may have influence on the distance between points, may for instance not affect the result, since very low distances of only a couple of length units (meters), e.g. no more than 5 meters, are between the points.

According to an exemplary aspect of all aspects of the present invention, the data comprises further a representative of a spatial metric associated with spatial properties associated with the respective road segment.

The representative of a spatial metric associated with spatial properties associated with a road segment of the at least one road segment may for instance be indicative of spatial properties of the road segment that influences autonomous driving, e.g. the number of intersections on the road segment, and/or the number of lanes on the road segment, to name but a few non-limiting examples.

According to an exemplary aspect of all aspects of the present invention, the spatial properties are associated with two dimensional or three dimensional dimension.

The determining of the sinuous driving metric may for instance be based at least partially on spatial properties of two dimensional dimension, which may enhance easier determining of the sinuous driving metric due to reduced calculation complexity. In an alternative embodiment, the sinuous driving metric may for instance be based at least partially on spatial properties of three dimensional dimension, which may be even more accurate.

In an exemplary embodiment according to all aspects of the present invention, the lane distance metric is determined based at least partially on a ratio between a lateral movement value and a forward movement value, wherein the lateral movement value and the forward movement value are determined (e.g. computed) based at least partially on the obtained data and the obtained probe data.

The lateral movement value may for instance be indicative of a lateral movement represented by the at least one piece of position information with respect to the respective road segment.

The forward movement value may for instance be indicative of a forward movement represented by the at least one piece of position information with respect to the respective road segment.

The ratio may for instance be used for a normalization of values in order to achieve comparable values of the sinuous driving metric. The ratio may for instance be unaffected by a shape or a length of the representative of the at least one link associated with the respective road segment.

According to an exemplary aspect of all aspects of the present invention, for determining the lane distance metric, the obtained data and the obtained probe data are defined as vectors.

By defining the obtained data and the obtained probe data as vectors, vector based operations may for instance be performed, e.g. to determine the lane distance metric. For instance, the dot product between a point represented by the at least one position information and at least one other point of the respective road segment may be calculated. By calculating this dot product, the closest point of the respective road of a line defined by the respective road segment to the point represented by the at least one position information may for instance be determined. In case the closest point is inside of the respective road segment, the distance between the closest point and the point represented by the at least one position information may for instance be determined to represent the lane distance metric. In case the closest point is outside of the respective road segment, the distance to the closest shape point of the respective road segment may for instance be determined to represent the lane distance metric.

In case the representative of at least one link comprises more than one road segment, the lane distance metric for each of the road segments may for instance be determined. The lane distance metric having the lowest value may for instance determined to be the actual lane distance metric for the at least one piece of position information. Each of the lane distance metrics determined for the other road segments may have a greater value. Thus, it can be assumed that these road segments are further away from the location represented by the at least one piece of position information.

In an exemplary embodiment according to all aspects of the present invention, the lane distance metric comprises a road side value indicative of whether the at least one piece of position information is located on a first road side of the respective road segment or on a second road side of the respective road segment.

According to an exemplary aspect of all aspects of the present invention, a dot product of the defined vectors is computed to determine whether the obtained probe data is associated with the first road side or the second road side of the respective road segment.

The determined lane distance may for instance be associated with a negative sign in case the at least one position information is located on a first road side (e.g. left road side, or right road side) of the respective road segment. The determined lane distance may for instance be associated with a positive sign in case the at least one position information is located on a second road side (e.g. right road side, or left road side) of the respective road segment.

In order to determine a lane distance metric associated with a negative sign or a positive sign, a dot product in vector form based at least partially on obtained data and obtained probe data defined as vectors may for instance be calculated. The sign of the result of the calculated dot product may for instance represent the first road side or the second road side of the representative of the at least one link associated with the respective road segment the at least one position information is located on.

In an exemplary embodiment according to all aspects of the present invention, a traversal percentage of the probe data is determined based at least partially on a spatial distribution associated with the probe data with respect to the respective road segment and the (one or more) determined lane distance metric(s).

The spatial distribution may for instance be determined for each road side of the at least one link associated with the respective road segment independently. The spatial distribution may for instance be indicative of the lane distance of the at least one piece of position information with respect to the respective road segment.

In case the sinuous driving metric is determined at least partially on more than one pieces of position information (e.g. the probe data comprises more than one sets of probe data each comprising at least one piece of position information, and/or the probe data comprises one set of probe data comprising more than one pieces of position information), a traversal percentage of each of the pieces of position information on the representative of the at least one link associated with the respective road segment may for instance be determined.

The traversal percentage may for instance be indicative of how far along the representative of the at least one link associated with the respective road segment the location of the at least one piece of position information is. For instance, the location may for instance be in the middle of the representative of the at least one link associated with the respective road segment with respect to the first road side or the second road side. In this aforementioned case, the traversal percentage will be 0.5. In case the location is further away from the middle of the representative of the at least one link associated with the respective road segment with respect to the first road side or the second road side, the traversal percentage will be of a value higher than 0.5, e.g. between 0.5 and 1. In case the location is closer to the other road side and away from the middle of the representative of the at least one link associated with the respective road segment with respect to the first road side or the second road side, the traversal percentage will be of a value lower than 0.5, e.g. between 0.5 and 0.

In the following, a so-called "multi-modality detection and clustering (MDC) algorithm" for determining the sinuous driving metric shall be considered to be disclosed.

According to an exemplary aspect of all aspects of the present invention, a vehicle lane pattern (VLP) metric is determined based at least partially on the determined lane distance metric, wherein the vehicle lane pattern metric is a value being indicative of a measure of an average number of lanes traversed (by e.g. a plurality of vehicles (of more than one (e.g. a plurality) of pieces of position information of the probe data)) associated with the respective road segment.

In order to determine a very accurate sinuous driving metric, some driving maneuvers, with may seem to be lane changes according to the probe data, but are not ones (e.g. lateral movements for avoiding potholes of the respective road segment, and/or lateral movements for avoiding parked vehicles, and/or incorrect probe data (e.g. a piece of position information is erroneous, e.g. due to interferences when gathering the piece of position information, and/or errors of the sensor used for gathering the piece of position information, to name but a few non-limiting examples), should not be considered. Thus, the vehicle lane pattern metric is determined.

The vehicle lane pattern metric may for instance be indicative of a measure of an average relative lateral movement of the at least one probe data associated with the at least one road segment in reference to a direction of travel associated with the at least one probe data.

The vehicle lane pattern metric may for instance represent clusters of lanes associated with the representative of at least one link associated with the respective road segment. The vehicle lane pattern may for instance comprise (i) a number of the clusters (e.g. peaks) in a histogram; (ii) a size of the clusters; (iii) a center of the clusters; (iv) a combination thereof.

The vehicle lane pattern metric is determined based at least partially on the determined lane distance metric. The determined lane distance metric may for instance be determined for the obtained probe data. The lane distance metric may for instance be determined for each of the respective sets of probe data in case the probe data comprises more than one set of probe data.

The vehicle lane pattern metric may for instance represent detected multi-modality and/or the number of clusters that relatively correspond to the number of lanes vehicles traversed on the representative of at least one link associated with the respective road segment. The vehicles, which traversed on the representative of at least one link associated with the respective road segment, are represented by the probe data.

In an exemplary embodiment according to all aspects of the present invention, the vehicle lane pattern metric is determined based at least partially on one or more pieces of historic probe data.

The historic probe data may for instance comprise one or more sets of historic probe data. Each of the one or more sets of historic probe data may for instance comprise at least one piece of position information. In case the historic probe data comprises more than one sets of historic probe data, one of the more than one sets of historic probe data may for instance be associated with a vehicle, and one of the more than one sets of historic probe data may for instance be associated with another vehicle.

According to an exemplary aspect of all aspects of the present invention, the historic probe data comprises at least one piece of position information.

The at least one piece of position information comprised by the historic probe data may for instance equal the at least one piece of position information comprised by the probe data.

According to an exemplary aspect of all aspects of the present invention, a number of clusters relatively corresponding to a number of lanes associated with the respective road segment is generated based at least partially on the determined lane distance metric, wherein the vehicle lane pattern metric is determined at least partially based on the respective number of clusters.

For each piece of position information comprised by the probe data, the lane distance metric may for instance be determined in reference to the direction of travel associated with the probe data. For an indication of the direction of travel associated with the probe data, the at least one piece of position information of a first road side may for instance marked to be on a negative x-axis or on a positive x-axis, wherein the zero crossing of the x-axis is set according to the center of the representative of the at least one link associated with the respective road segment. Using one-dimensional vector or arrays comprising all lane distance metric associated with each of the pieces of position information of the probe data, the one-dimensional vector may for instance be converted to a linear positive vector, e.g. by computing the amount of said vector.

This computed vector may be analyzed to detect multi-modality and generate the number of clusters associated with the representative of the at least one link of the respective road segment.

In this way, the average number of lanes vehicles traversed on the representative of at least one link associated with the respective road segment may for instance be obtained. This metric may for instance represent the sinuous driving metric.

In an exemplary embodiment according to all aspects of the present invention, the sinuous driving metric is determined based at least partially on the vehicle lane pattern metric and probe data obtained over at least one time epoch period.

The sinuous driving metric may for instance be inferable of the vehicle lane pattern metric and probe data obtained over at least one time epoch period.

The time epoch period may for instance be indicative of a time or time period the probe data was obtained (e.g. gathered by the first apparatus and/or the electronic device). The time epoch period may for instance further be indicative of a date a date at which the probe data was obtained (e.g. gathered by the first apparatus and/or the electronic device).

The probe data obtained over at least one time epoch period may for instance represent historic data, obtained prior to performing and/or controlling the method according to all aspects of the present invention. The sinuous driving metric may for instance be determined based on probe data obtained over a time epoch period of one or more days, e.g. 2 to 7 days, preferably 3 to 6 days, in particular 4 to 5 days. Alternatively, the sinuous driving metric may for instance be determined based on probe data obtained over a time epoch period of one or more hours, e.g. 3 to 24 hours, preferably 6 to 18 hours, in particular 9 to 12 or 15 hours. Time epoch periods longer than one or more weeks may for instance be not accurate enough for a use case of determining road segments, which an autonomous vehicle may use e.g. for driving from a starting point to a finishing point, since a sinuous driving metric obtained based on data obtained over a time epoch period that long may average out e.g. current changes of driving associated with the respective road segment. Thus, actual probe data may for instance be weighted more when determining a sinuous driving metric than probe data obtained further in the past.

The probe data obtained over at least one time epoch period may for instance be the historic probe data. A determined sinuous driving metric may for instance be enhanced by further probe data, e.g. actual probe data. The probe data used for determining the sinuous driving metric may for instance be expanded by adding the further probe data resulting in new probe data. According to an exemplary aspect of the present invention, this new probe data may for instance be used for performing and/or controlling the method according to all aspects of the present invention instead of the probe data. In this way, the sinuous driving metric may for instance be updated.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE DRAWINGS

In the figures show:

FIG. 4 depicts sample SDM metrics according to an example embodiment of a method of the present invention;

FIG. 5 depicts a sample lane distance metric according to an example embodiment of a method of the present invention;

DETAILED DESCRIPTION

The following description serves to deepen the understanding of the present invention and shall be understood to complement and be read together with the description as provided in the above summary section of this specification.

Figure 1:
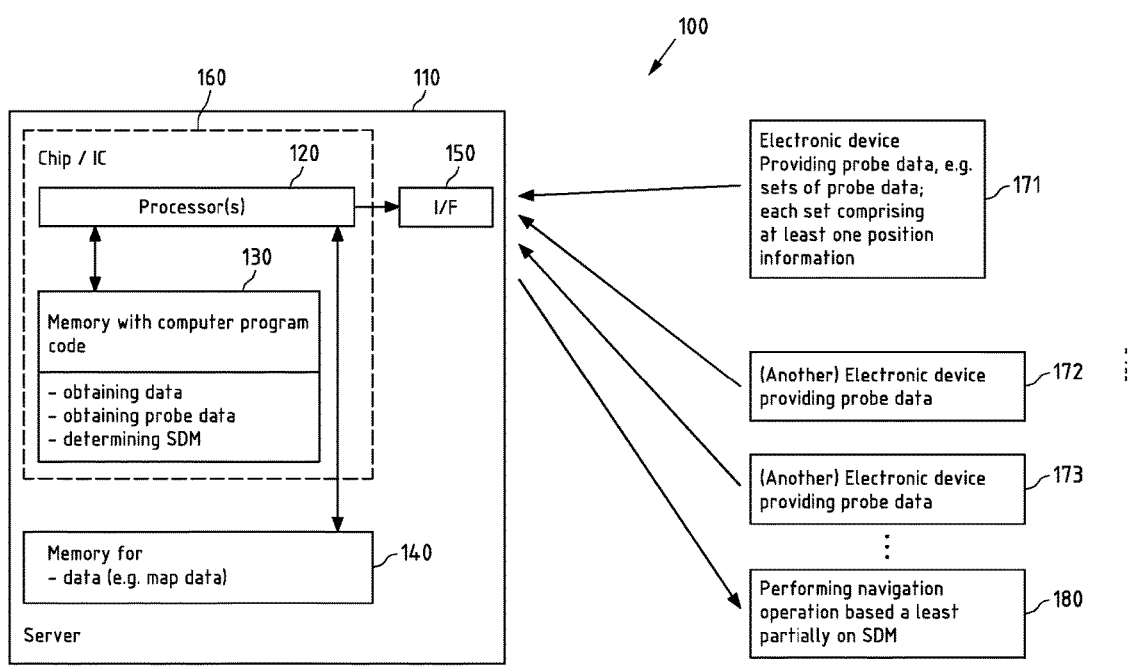
FIG. 1 a schematic block diagram of an example embodiment of a system comprising an example apparatus according to the present invention.

FIG. 1 is a schematic block diagram of an example embodiment of a system comprising an example apparatus according to the present invention.

Figure 12:
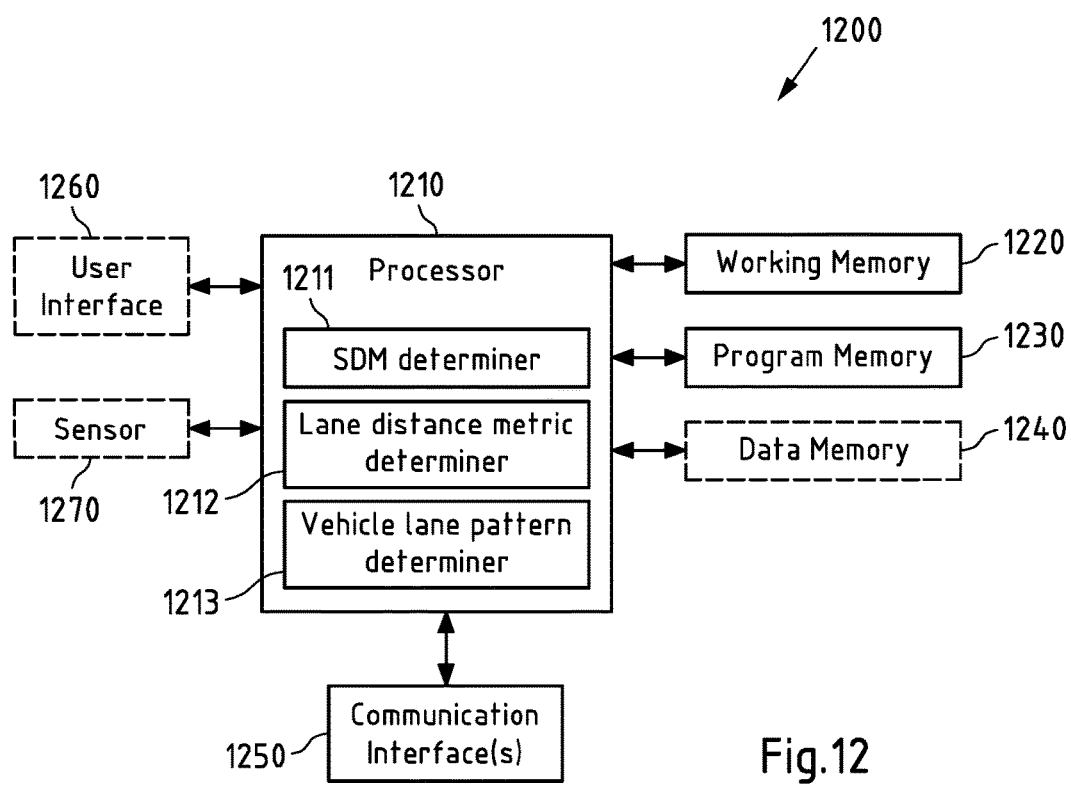
FIG. 12 a schematic block diagram of an example embodiment of an apparatus according to the present invention.

The system 100 comprises a server 110, which may comprise the at least one apparatus 1200 of FIG. 12. Furthermore, the system 100 comprises a plurality of electronic device 171, 172, 173, 180.

Server 110 comprises a processor 120 that is linked to a first memory 130, to a second memory 140 and to a communication interface "I/F" 150. Processor 120 is configured to execute computer program code, including computer program code stored in memory 130, in order to cause server 110 desired actions.

Memory 130 stores computer program code for (i) obtaining data associated with each road segment of at least one road segment, said data comprising: a representative of at least one link associated with the respective road segment; (ii) obtaining probe data associated with the respective road segment, the probe data comprising: at least one piece of position information; (iii) determining a sinuous driving metric, which is a value being indicative of a sinuosity of driving on the respective road segment based at least partially on the probe data and its allocation with respect to the respective road segment, wherein these may correspond to steps 201, 202, 203 of FIG. 2. Furthermore, memory 130 may for instance store computer program code for providing (e.g. outputting) a sinuous driving metric to other devices, e.g. electronic device 171, 172, 173, 180. The computer program code may comprise for example similar program code as 1230 of FIG. 12. In addition, memory 130 could store computer program code configured to realize other functions. Additionally, memory 130 could also store other kind of data.

Processor 120 and memory 130 may optionally belong to a chip or an integrated circuit 160, which may comprise in addition various other components. For instance, the chip or the integrated circuit 160 may comprise a further processor or memory. It may comprise for instance a working memory (e.g. working memory 1220 of FIG. 12) for processor 120.

Figure 2:
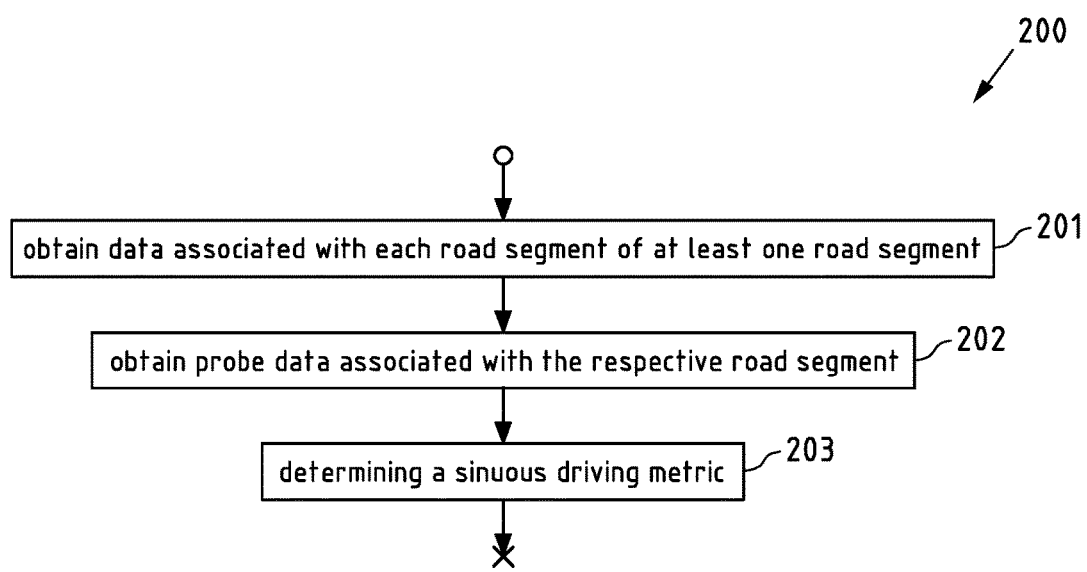
FIG. 2 a flow chart illustrating an example operation, e.g. in the at least one apparatus of FIG. 12, of an example method according to the present invention.

Memory 140 is configured to store data, for example the data comprising the representative of at least one link associated with the respective road segment, which is obtained in step 201 of FIG. 2. Furthermore, memory 140 may be configured to store sets of data comprised by the data, e.g. obtained (e.g. received) from electronic device 171, 172, 173, 180.

For instance, an electronic device 171, 172, 173, 180 may be for instance a mobile communication device, like a smartphone, tablet, or a navigation device that may for instance be integrated in a vehicle (e.g. an autonomous vehicle), or any other mobile device. For instance, the electronic device 171, 172, 173, 180 may move or may have moved on at least one road segment of the at last one road segment. The electronic device 171, 172, 173, 180 may collect probe data and send this probe data comprising at least one piece of position information to the server 110. The probe data may further comprise a plurality of pieces of position information forming a set of probe data. Additionally, the probe data may comprise at least one of: (i) location based data (e.g. representing a piece of position information); (ii) time stamp data (representing a time epoch information).

The location based data may comprise information on the location. The time data may for instance be indicative of when (a time and/or date, or a time epoch representing a period of time, to name but a few non-limiting examples) the information on the location has been measured by the respective electronic device. Each set of probe data may for instance be associated with a respective road segment of the at least one road segment, wherein this association may be performed based on the location based data of the set of probe data.

For instance, the obtaining data associated with each road segment of at least one road segment, said data comprising: a representative of at least one link associated with the respective road segment may be performed by server 110.

For instance, the obtaining probe data associated with the respective road segment, the probe data comprising: at least one piece of position information may be performed by server 110.

For instance, the determining a sinuous driving metric, which is a value being indicative of a sinuosity of driving on the respective road segment based at least partially on the probe data and its allocation with respect to the respective road segment may be performed by server 110, at least partially based on the data associated with this road segment. Exemplary details are provided in this specification. More exemplary details will be provided with respect to FIG. 3.

The optional providing of the determined sinuous driving metric may comprise transmitting the sinuous driving metric from server 110 to another server, or to electronic device 180 via the communication interface 150. This transmission may for instance be performed via the Internet and/or a wireless network and/or a wireline network. Further, the obtaining of the probe data may for instance be receiving the probe data from at least one of the electronic device 171, 172, 173 by the communication interface 150 of server 110. This transmission may for instance be performed via the Internet and/or a wireless network and/or a wireline network.

As an example, the transmitting of probe data from the electronic device 171, 172, 173 to server 110, or the transmitting of the determined sinuous driving metric from server 110 to another server, or to electronic device 180 may be performed based on push service. For instance, the server 110 may send the determined sinuous driving metric, e.g. when there is an update to the sinuous driving metric associated with the respective road segment of the at least one road segment. Or, as another example, the transmission of probe data from at least one of the electronic devices 171, 172, 173 to server 110 may be performed based on pull service, wherein the server 110 may request the electronic device 171, 172, 173 the probe data. For instance, the push or pull service may be performed based on request-response communication system over e.g. a TCP/IP communication protocol. Furthermore, as an example, the transmitting of probe data may be performed by one or more electronic devices 171, 172, 173, 180 to server 110, and/or the transmitting of determined sinuous driving metric may be performed from server 110 to one or more electronic device 171, 172, 173, 180.

Based on the determined sinuous driving metric received at e.g. the electronic device 180, the electronic device may perform navigation operations. These navigation operations performed on the determined sinuous driving metric may be considered to represent a further aspect of the present invention, and, in particular, a separate aspect of the present invention. Furthermore, the system 100 enables that probe data from different electronic devices 171, 172, 173, 180 can be aggregated and/or shared between the electronic devices 171, 172, 173, 180. For instance, if an electronic device sends new probe data regarding one or more road segments, this new probe data can be used for determining a new sinuous driving metric associated with the one or more road segments. Then, the new sinuous driving metric may for instance be provided to the electronic devices for performing a better navigation.

FIG. 2 shows a flow chart illustrating an example operation, e.g. in the at least one apparatus of FIG. 12, of an example method according to the present invention.

In step 201, data associated with each road segment of at least one road segment is obtained, e.g. by server 110 of FIG. 1. The data is obtained e.g. by receiving the data from another entity (not shown in FIG. 1), or the data is obtained of a memory (e.g. memory 140 of FIG. 1), wherein the data is stored in the memory.

In step 202, probe data associated with the respective road segment is obtained, e.g. by server 110 of FIG. 1. The probe data is obtained e.g. by receiving the probe data from one or more electronic device, e.g. electronic device 171, 172, 173, 180 of FIG. 1. The probe data may for instance be obtained of a memory (e.g. memory 140 of FIG. 1), wherein the probe data is stored in the memory. Stored probe data of the memory may for instance comprise historic probe data, e.g. probe data obtained over a predefined time epoch period, e.g. probe data obtained over the last two days to name but one non-limiting examples.

In step 203, the sinuous driving metric is determined based at least partially on the probe data and its allocation with respect to the respective road segment, wherein the sinuous driving metric is a value being indicative of a sinuosity of driving on the respective road segment. Further details will be provided with respect to FIG. 3

Figure 3:
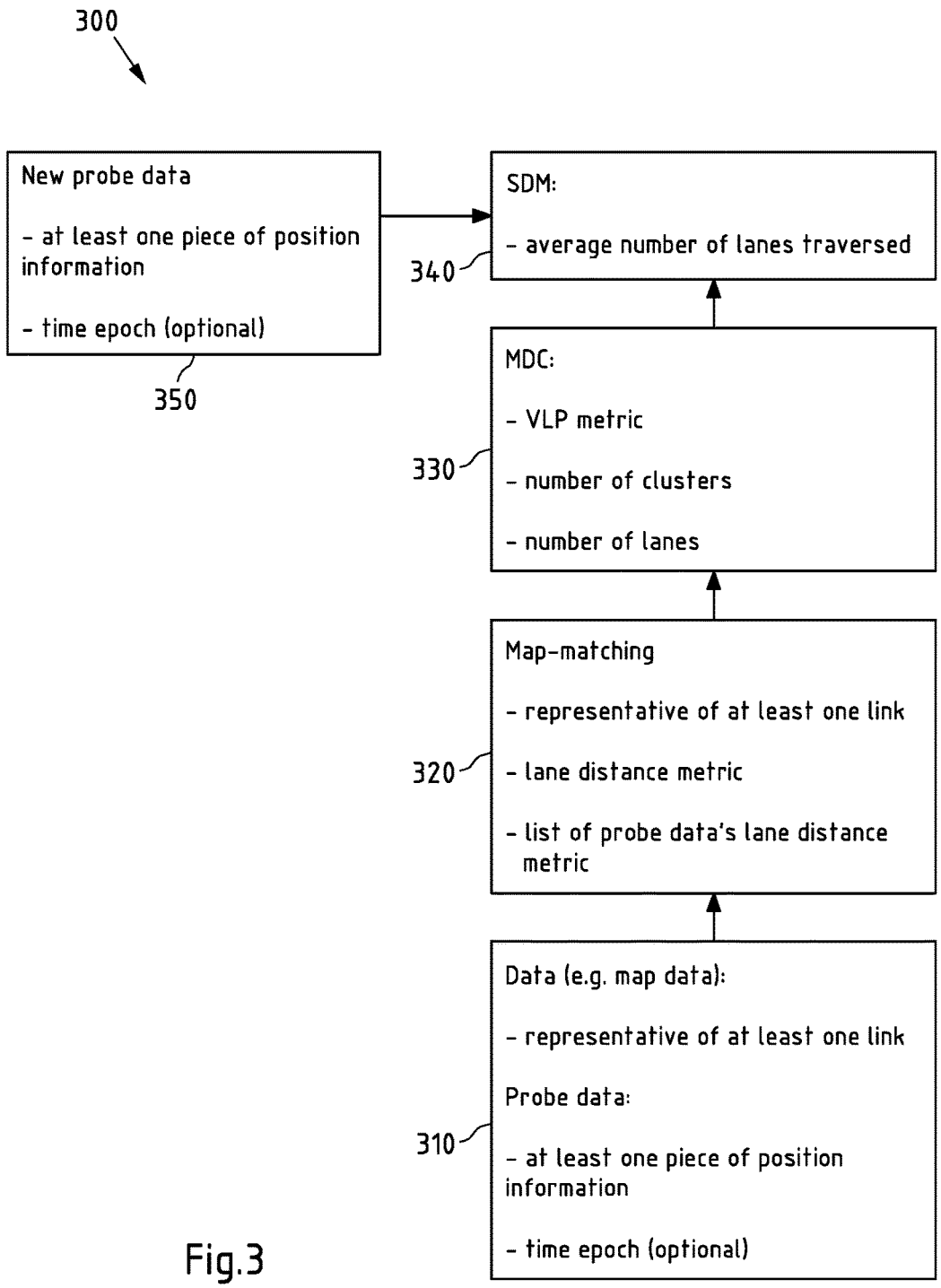
FIG. 3 a schematic flow chart of an example embodiment of a method according to the present invention.

FIG. 3 shows a schematic flow chart of an example embodiment of a method according to the present invention.

The flow chart shows the flow (starting at the bottom of FIG. 3) from (e.g. raw) probe data comprising at least one piece of position information and data comprising a representative of at least one link associated with the respective road segment to a determined sinuous driving metric (at the top of FIG. 3).

At first, obtained data (e.g. map data) and obtained probe data (e.g. trajectories of vehicles) may for instance be allocated accordingly on a map. The obtained data comprises a representative of at least one link associated with at least one road segment. Thus, the probe data may for instance be located at least nearby of such a representative of at least one link associated with at least one road segment. The probe data may for instance be historic probe data, e.g. obtained over a predefined time epoch period, e.g. a period of two days.

Map-matching—as described in this specification—may for instance be performed. The at least one piece of position information of the probe data may for instance be associated with the respective road segment. Based on this, one or more lane distances (d-values) may be determined for the at least one piece of position information resulting in a lane distance metric. Further, the traversal percentage may be determined, wherein the traversal percentage may for instance be indicative of how far along the at least one link associated with the respective road segment is. The traversal percentage may for instance be determined for the at least one piece of position information. In case the probe data comprises a plurality of pieces of position information, a plurality of traversal percentages each associated with each of the plurality of pieces of position information may for instance be determined.

The lane distance metric and the traversal percentages may for instance be used for determining the vehicle lane pattern metric. For instance, based at least partially on the lane distance metric and the traversal percentages of the lane clusters may be determined, e.g. based on the historic probe data. Further, a number of lane clusters may be determined based at least partially on the lane distance metric and the traversal percentages of the lane clusters. The results determined may for instance be used for determining the vehicle lane pattern metric, e.g. comprising the determined clusters and/or number of lane clusters.

Based at least partially on the vehicle lane pattern metric, a sinuous driving metric may for instance be determined, wherein the sinuous driving metric is a value being indicative of a sinuosity of driving on the respective road segment. An average number of lanes traversed may for instance be inferred based at least partially on the clusters of the vehicle lane pattern metric.

New probe data may be added to a determined sinuous driving metric. This may for instance allow a determined sinuous driving metric to be updated, e.g. in predefined or determined according to predefined rules time intervals. Adding new probe data may for instance be a dynamic and time dependent component of the present invention. For instance, new probe data may be obtained over a predefined or determined according to predefined rules time epoch. The vehicle lane pattern metric may for instance be used to infer the average number of lanes traversed of the new probe data over the predefined or determined according to predefined rules time epoch time epoch.

FIG. 4 depicts sample SDM metrics according to an example embodiment of a method of the present invention.

FIG. 4 shows in the left illustration a road segment having a sinuous driving metric of a value of zero (SDM=0). On the road segment, four trajectories for instance of vehicles (represented by different line styles) are shown, each represented by probe data obtained e.g. by electronic devices (e.g. electronic device 171, 172, 173, 180 of FIG. 1) which have moved together with a vehicle, or which are implemented in the vehicles. It can be seen that the drivers of the vehicles maintain their lane in the shown road segment and there are no lane changes at all.

In the right illustration of FIG. 4, the road segment shown has a sinuous driving metric of a value of 0.8 (SDM=0.8). Several lane changes of vehicles have occurred, according to the probe data obtained e.g. by electronic devices (e.g. electronic device 171, 172, 173, 180 of FIG. 1) which have moved together with a vehicle, or which are implemented in the vehicles. The drivers of the vehicles do sudden lane changes and highly sinuous driving.

FIG. 5 depicts a sample lane distance metric according to an example embodiment of a method of the present invention.

The shown road segment is divided into four clusters: two clusters for the left road side of the road segment and two clusters for the right road side. The lane distance metric is exemplary shown by the dotted arrows marked by "d+" and "d-", wherein "d+" refers to lanes distances of exemplary position information of probe data associated with the right road side of the road segment, and "d-" refers to lanes distances of exemplary position information of probe data associated with the left road side of the road segment. The clusters of the lanes may for instance be determined based at least partially on historic probe data. Vehicles represented by the position information (each illustrated dot refers to a piece of position information) with different lane distance metrics who are located in the same cluster may for instance be treated to be in the same lane (e.g. right or left road side of the road segment).

Figure 6A:
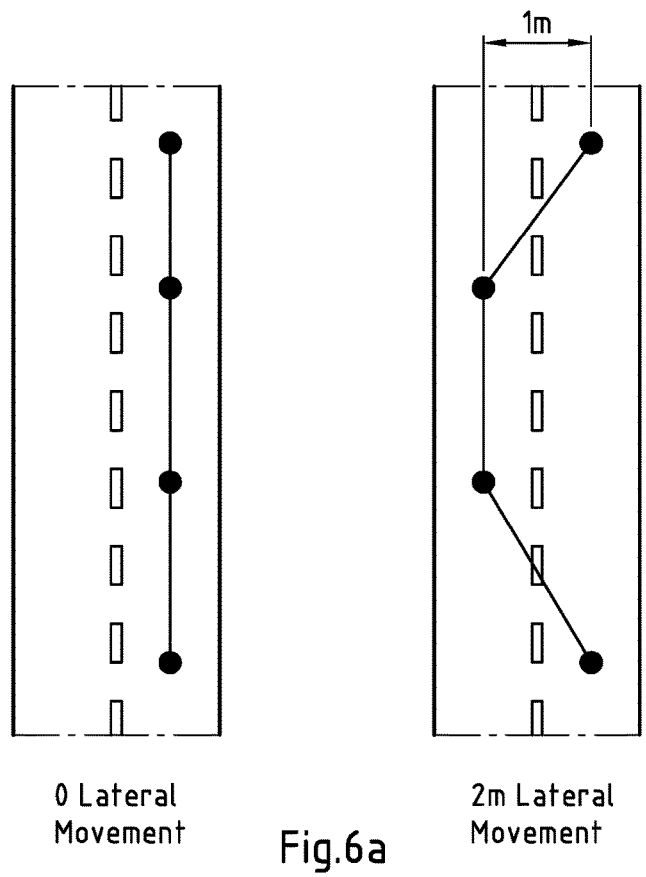
FIG. 6a depicts an example of lateral movement according to probe data of an example embodiment of a method of the present invention.

FIG. 6a depicts an example of lateral movement according to probe data of an example embodiment of a method of the present invention.

In the left depicted road segment of FIG. 6a, the trips represented by probe data comprising a plurality of pieces of position information shows zero lateral movement. An example of lateral movement may for instance be a lane change, or at least the portion of that movement that is not a forward movement. Thus, lateral movement may be accompanied by forward movement, as can be seen in the right depicted road segment of FIG. 6a.

Figure 6B:
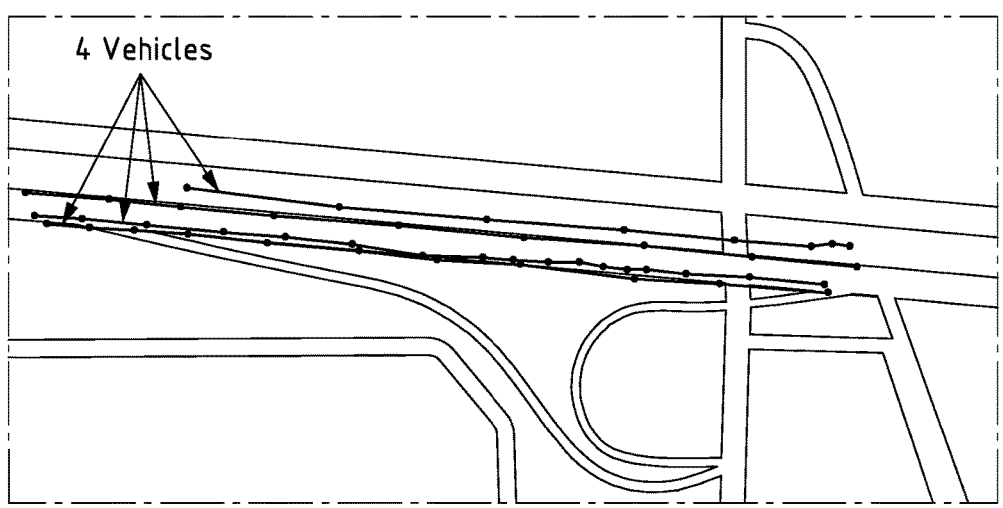
FIG. 6b depicts an example of lateral movement according to probe data of an example embodiment of a method of the present invention.

FIG. 6b depicts an example of lateral movement according to probe data of an example embodiment of a method of the present invention.

Four different trajectories represented by probe data (e.g. trajectories of vehicles) are shown on a road segment. According to the trajectories, two vehicles were driving on a first lane (the upper two illustrated trajectories), but according to erroneous probe data, which results in a different determined lane metric may for instance lead to the assumption that both vehicles have different lateral distances, and may be driving in different lanes. For determining a sinuous driving metric without being affected by such erroneous probe data, a vehicle lane pattern metric (as shown in FIG. 5) may be determined.

Figure 7:
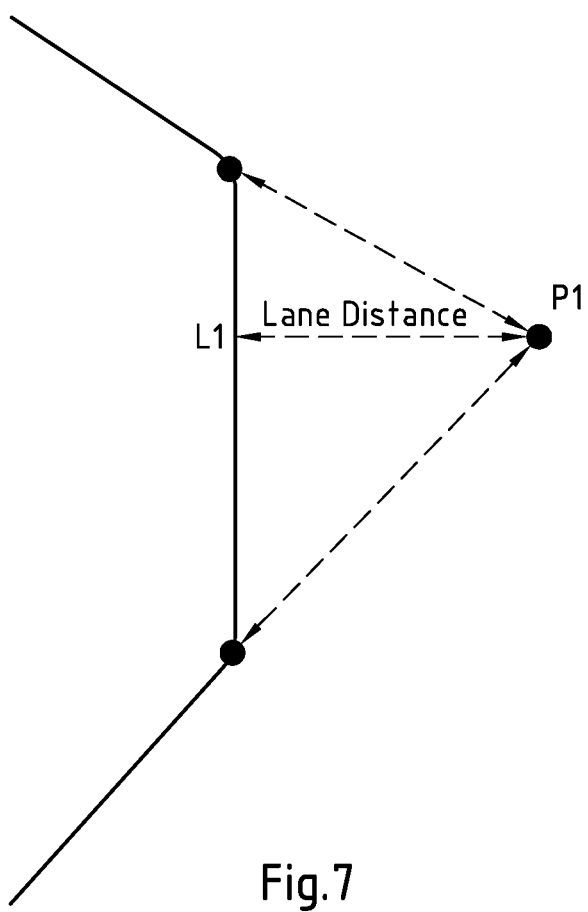
FIG. 7 depicts an example of lane distances for one piece of position information of an example embodiment of a method of the present invention.

FIG. 7 depicts an example of lane distances for one piece of position information of an example embodiment of a method of the present invention.

A lane distance, e.g. for the lane distance metric, may for instance be calculated based on geometrical formulas. FIG. 7 shows a representative of a position information (point P1) according to probe data and its allocation with respect to a representative of a link associated with a road segment. The representative of the link may for instance be divided into three segments S1, S2, and S3. Then, the lane distance of the point P1 to each of the segments is calculated. The calculated lane distance are shown by the dotted double arrows L1, L2 and L3, wherein L1 refers to the lane distance of the point P1 to the road segment S1, L2 refers to the lane distance of the point P1 to the road segment S2, and L3 refers to the lane distance of the point P1 to the road segment S3. The lowest lane distance may for instance be chosen to be the actual lane distance for the point P1, at hand is lowest lane distance is L1. As can be seen, point P1 is located adjacent to the road segment S1. Thus, the point P1 may be assumed to be associated with that road segment S1.

Figure 8A:
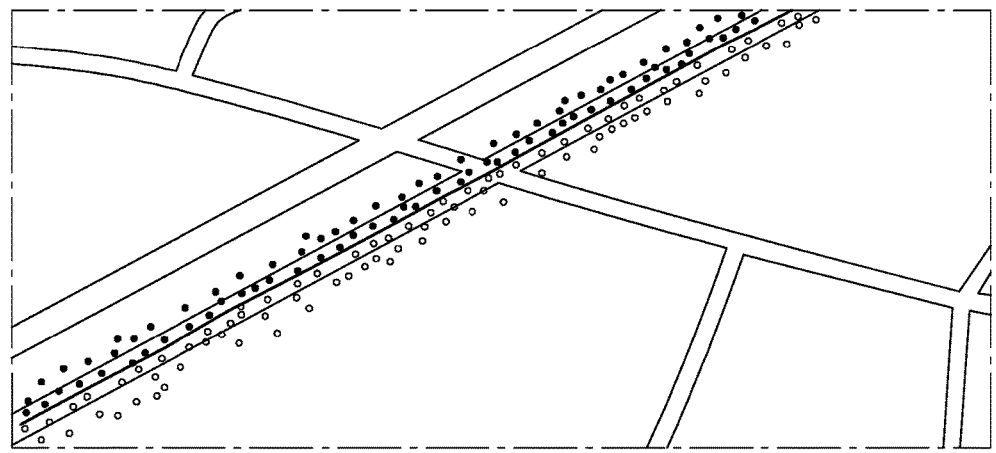
FIG. 8a, b each depict different visualizations of a spatial distribution of probe data with respect to a representative of at least one link associated with a road segment of an example embodiment of a method of the present invention.
Figure 8B:
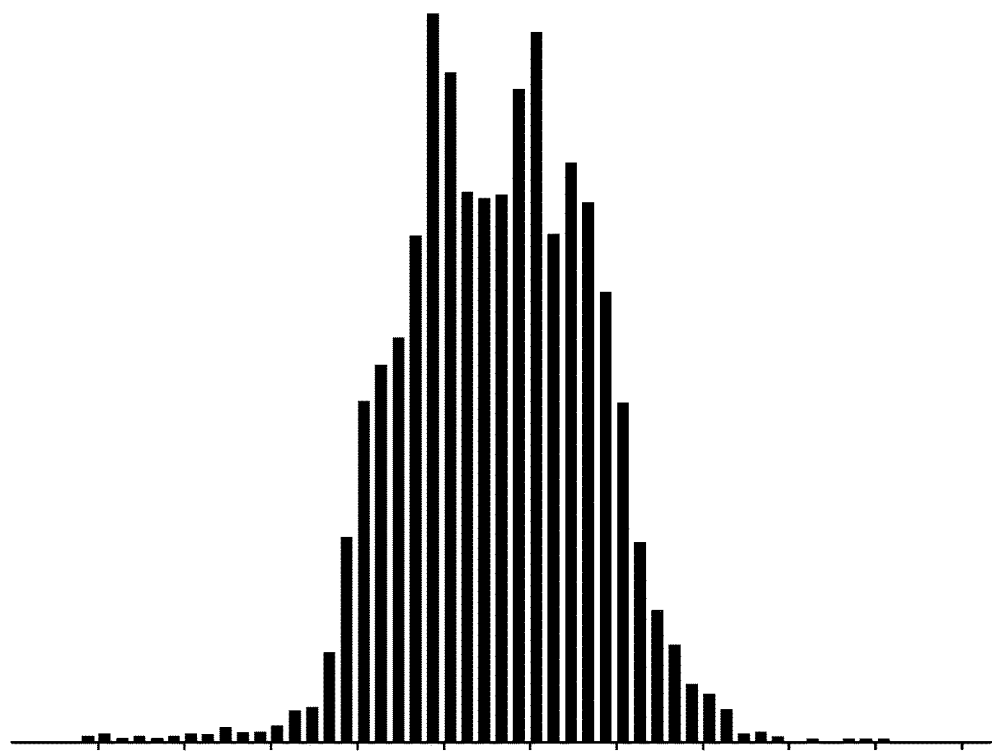

FIG. 8a and FIG. 8b each depict different visualizations of a spatial distribution of probe data with respect to a representative of at least one link associated with a road segment of an example embodiment of a method of the present invention.

In case a plurality of pieces of position information and their lane distances to a road segment are determined, the spatial distribution of the plurality of pieces of position information on the representative of at least one link associated with at least one road segment may for instance be analyzed.

FIG. 8a shows such a spatial distribution visualized on a map. FIG. 8b shows the same spatial distribution in the form of a graph, wherein the spatial distribution roughly equals a Gaussian distribution.

Figure 9:
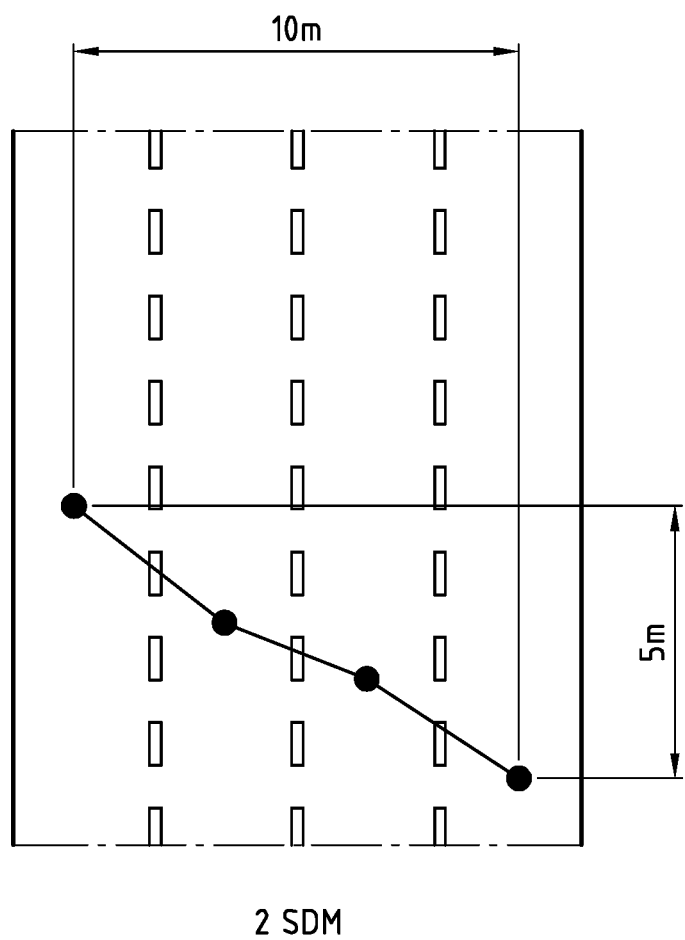
FIG. 9 depicts a sample SDM metric according to an example embodiment of a method of the present invention.

FIG. 9 depicts a sample SDM metric according to an example embodiment of a method of the present invention. The illustration depicts an extreme example of very high lateral movement according to obtained probe data. Several lane changes have occurred resulting in a lateral movement of about 10 meters, during a forward movement of only 5 meters. This lateral movement may for instance result in a sinuous driving metric of the value of 2 (SDM=2).

Figure 10A:
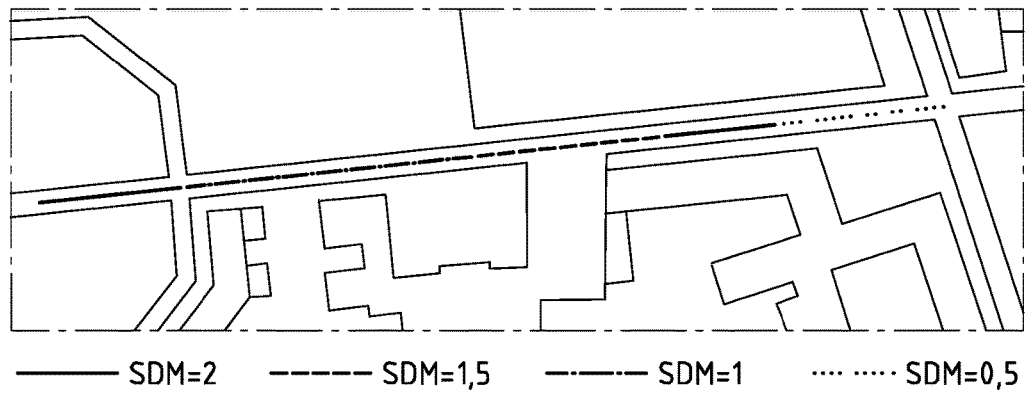
FIG. 10a, b each depict an example visualization of a determined SDM metric for a road segment according to an example embodiment of a method of the present invention.
Figure 10B:

FIG. 10a and FIG. 10b each depict an example visualization of a determined SDM metric for a road segment according to an example embodiment of a method the present invention.

A determined sinuous driving metric for the shown road segment is overlayed on a map. According to the visualization, different lines (e.g. dotted line, dashed line, dash-dotted line, solid line) is used for visualizing different SDM values. In this way, it can be visualized on which part of a road high sinuous driving occurs, e.g. autonomous vehicles may be able to avoid such road segments.

Figure 11:
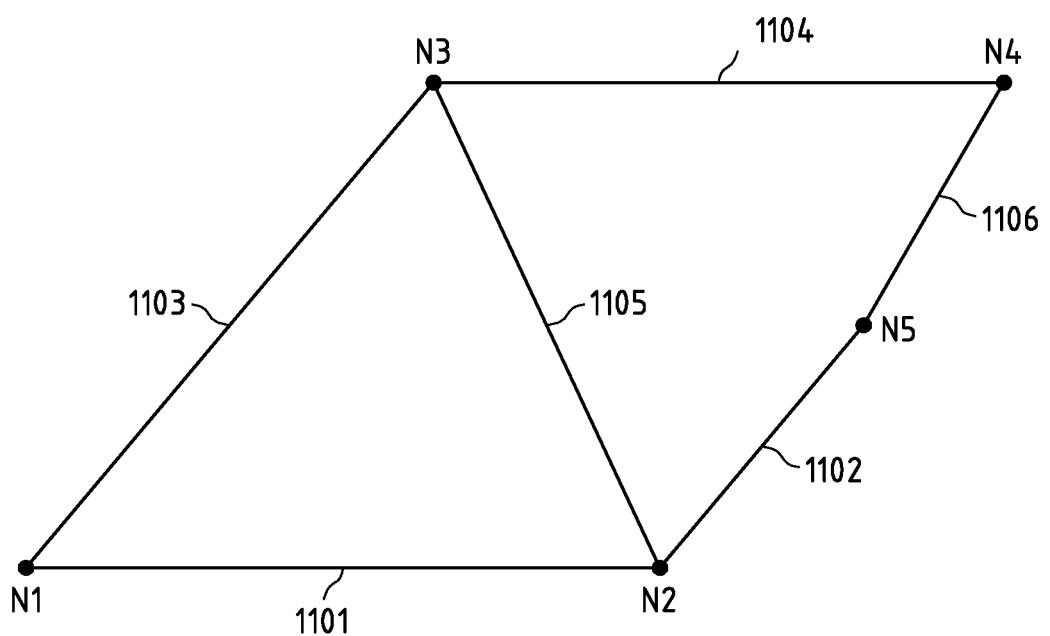
FIG. 11 depicts an example of several road segments.

FIG. 11 shows an example for performing navigation under consideration of a sinuous driving metric associated with road segments. FIG. 11 shows the example with respect to six road segments 1101, 1102, 1103, 1104, 1105 and 1106. For instance, the navigation may be used to determine a route from point N1 to point N5. For instance, the sinuous driving metric of road segment 1101 may be SDM=0.2, the sinuous driving metric of road segment 1102 may be SDM=0.5, the sinuous driving metric of road segment 1103 may be SDM=0.2, the sinuous driving metric of road segment 1104 may be SDM=0.1, the sinuous driving metric of road segment 1105 may be SDM=0.8, and the sinuous driving metric of road segment 1101 may be SDM=0.2. The range of the sinuous driving metric may be between 0 and e.g. 2, wherein 0 may indicate a road with very low sinuous driving associated with (e.g. all drivers hold the lane, no lane changes at all) and 2 may indicate a road with very high sinuous driving associated with (e.g. all drivers change very frequently lanes).

For instance, if it is requested to choose a route with very low sinuous driving associated with it, it shall be determined a route starting from N1 via road segment 1103, point N3, road segment 1104, point N4 and road segment 1106 may be determined for navigation, since the probability of risk, in particular for uncertainties, is minimized based on the sinuous driving metric of the road segments. This may not be the fastest and/or shortest possible route.

Furthermore, as an example embodiment, it may be requested (e.g. by an autonomous vehicle user) that the user agrees with a maximum risk of uncertainties, which may happen while driving autonomously. Then, only those road segments may be used for building a route for navigation which sinuous driving metrics do not exceed the maximum risk of uncertainties, as defined by the user. Other criteria may for instance be fastest and/or shortest possible route.

For instance, a travel-time may be associated with each road segment. Then, with respect to an example of performing navigation from point N1 to point N5 and under the assumption that the other criteria is set to fastest possible route, those road segments are selected building a path from point N1 to point N5 that fulfil the corresponding request. As an example, the travel-time associated with a road segment may be determined based at least partially on the representative of a metric of this road segment, wherein this representative may indicate the average speed on this road segment, and/or the length associated with this road segment.

Or, for instance, a length may be associated with each road segment. Then, with respect to an example of performing navigation from point N1 to point N5 and under the assumption that the other criteria is shortest possible route, those road segments are selected building a path from point N1 to point N5 that fulfil the corresponding request of the user and ensure shortest possible route-length-time based on the lengths associated with the road segments.

Furthermore, an electronic device (e.g. electronic device 171, 172, 173, and/or 180 of FIG. 1) may receive updates of the sinuous driving metric for at least one road segment during operation such that navigation may be updated and new paths for navigating to a destination may be calculated based on the updated sinuous driving metric.

The navigation may for instance be performed by a mobile device being associated with or comprising by an autonomous vehicle, wherein the mobile device may be integrated in the autonomous vehicle, based on the provided sinuous driving metric of the at least one road segment.

FIG. 12 is a schematic block diagram of an apparatus 1200 according to an exemplary aspect of the present invention, which may for instance represent the electronic device 171, 172, 173 and/or 180 of FIG. 1. Alternatively, the schematic block diagram of the apparatus 300 according to an exemplary aspect of the present invention may for instance represent server 110 of FIG. 1.

Apparatus 1200 comprises a processor 1210, working memory 1220, program memory 1230, data memory 1240, communication interface(s) 1250, an optional user interface 1260 and an optional sensor(s) 1270.

Apparatus 1200 may for instance be configured to perform and/or control or comprise respective means (at least one of 1210 to 1270) for performing and/or controlling the method according to the first exemplary aspect. Apparatus 1200 may as well constitute an apparatus comprising at least one processor (1210) and at least one memory (1220) including computer program code, the at least one memory and the computer program code configured to, with the at least one processor, cause an apparatus, e.g. apparatus 1200 at least to perform and/or control the method according to exemplary aspects of the invention.

Processor 1210 may for instance comprise an SDM determiner 1211 as a functional and/or structural unit. SDM determiner 1211 may for instance be configured to determine a sinuous driving metric (see step 203 of FIG. 2; block 340 of FIG. 3). Processor 1210 may for instance comprise a lane distance metric determiner 1212 as a functional and/or structural unit. Lane distance metric determiner 1211 may for instance be configured to determine a lane distance metric (see block 320 of FIG. 3). Processor 1210 may for instance comprise a vehicle lane pattern metric determiner 1213 as a functional and/or structural unit. Vehicle lane pattern metric determiner 1211 may for instance be configured to determine a vehicle lane pattern metric (see block 330 of FIG. 3). Processor 1210 may for instance further control the memories 1220 to 1240, the communication interface(s) 1250, the optional user interface 1260 and the optional sensor(s) 1270.

Processor 1210 may for instance execute computer program code stored in program memory 1230, which may for instance represent a computer readable storage medium comprising program code that, when executed by processor 1210, causes the processor 1210 to perform the method according to the first exemplary aspect.

Processor 1210 (and also any other processor mentioned in this specification) may be a processor of any suitable type. Processor 1210 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 1210 may for instance be an application processor that runs an operating system.

Program memory 1230 may also be included into processor 1210. This memory may for instance be fixedly connected to processor 1210, or be at least partially removable from processor 1210, for instance in the form of a memory card or stick. Program memory 1230 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 1230 may also comprise an operating system for processor 1210. Program memory 1230 may also comprise a firmware for apparatus 1200.

Apparatus 1200 comprises a working memory 1220, for instance in the form of a volatile memory. It may for instance be a Random Access Memory (RAM) or Dynamic RAM (DRAM), to give but a few non-limiting examples. It may for instance be used by processor 1210 when executing an operating system and/or computer program.

Data memory 1240 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 1240 may for instance store data, e.g. map data. Data may for instance represent at least one link associated with a road segment of at least one road segment. Data may comprise one or more sets of data, each set of data comprising one or more representatives of at least one link associated with a road segment of at least one road segment.

Communication interface(s) 1250 enable apparatus 1200 to communicate with other entities, e.g. with server 110 of FIG. 1. The communication interface(s) 1250 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 1200 to communicate with other entities, for instance with server 110 of FIG. 1.

User interface 1260 is optional and may comprise a display for displaying information to a user and/or an input device (e.g. a keyboard, keypad, touchpad, mouse, etc.) for receiving information from a user.

Sensor(s) 1270 are optional and may for instance comprise a barometric sensor, e.g. to gather pressure information.

Some or all of the components of the apparatus 1200 may for instance be connected via a bus. Some or all of the components of the apparatus 1200 may for instance be combined into one or more modules.

The following embodiments of the present invention shall also be considered to be disclosed:

In order to calculate significant lateral movement of cars, e.g. lane changes, over taking etc., some form of lane-level insight of a road segment and/or e.g. GPS probe data is needed. It is well known that probe data is very noisy and it is hard to do normal link-level map-matching. Lane-level map-matching is even harder. Thus, clever ways to measure lateral maneuvers and/or lane changes of probes on a road segment are needed.

The idea is to inspect raw probes and capture the intrinsic lane-level pattern in these raw data and use this to elicit the spatial multi-modality embedded on each link based on the different number of lanes on the road as vehicles on different lanes would form different spatial clusters.

The multi-modal pattern formed by the raw probes can be automatically detected using a custom developed clustering algorithm MDC (multi-modality detection and clustering), this algorithm generates the number of lane clusters a road segment (link) may have such that if a vehicle is found traversing more than one cluster it's a relative indication of lane changes.

The raw probes lane distance (d-value) may for instance be used to measure the relative lateral movement of a vehicles probe trajectory, and a historical cluster of several of the lane-distance metrics may for instance be used to gain insight to actual lane maneuvers. This may form a method comprising two algorithms.

The first algorithm may for instance generate a metric that describes the lateral movement pattern on a single road as represented by a roadway map database. A lateral movement may for instance be indicative of a movement that does increase the percentage of link traversed, or does not make the vehicle move forward to its destination (the end of the road, or the end of the map database polyline representation of the road). An example of a lateral movement is a change of lane, or at least the portion of that movement that does not move the car forward.

The first algorithm may for instance compute the lateral movement, along with the forward movement, for an ensemble of trips, and may for instance use the ratio of these two values to compute a metric of the average lateral activity for a map-link.

The higher this ratio is, the more the drivers of the vehicles associated with this link typically change lane or generally move to the left or right. This metric is very straight forward and easy to understand since it represents the average meters spent travelling to the left or right for every meter spent travelling forward relative to a map database.

This metric is directly proportional to the average number of lane changes, but much easier to compute.

However, this solution alone may show problems that are not lane changes, such as people avoiding potholes or badly parked cars, or probe satellite errors that would not be caught using the average lane changes metric.

For example, FIG. 6b shows vehicle trajectories on a road link, in which two of the vehicles are both driving on lane 1, but the GPS DOP error make their lane distance metric different and this can make this model assume both vehicles to have different lateral distances.

The second algorithm may for instance be used to solve this by using the VLP illustrated in FIG. 5, such that distinct lane clusters are already known (e.g. learned from historical lane distance data) and multiple vehicles with different lane distances who fall in the same cluster are treated as to be in same lane and both will have same lane distances (the lane distance from the cluster center).

The first step of both algorithms is to generate a lane distance metric for each probe The lane distance is defined as the closest perpendicular distance from the probe raw position to a segment of the link. It represents the distance from the center of the road.

As shown in FIG. 7, the lane distance may for instance be computed through a series of geometrical formulas, where the coordinates are treated as if they were points in a 2D space. The spherical shape of the earth does not affect the result since it is calculated with very low distances.

The link is splitted into segments, where each segment is defined by a couple of consecutive shape points. Then, for each segment the algorithm may for instance calculate the lane distance for the probe. For instance, the following algorithm (shown in exemplary computer program code) may be used:

```
function distancePointFromSegment(p, seg1, seg2)     {
    let aX = seg2.lng - seg1.lng;
    let aY = seg2.lat - seg1.lat;
    let bX = p.lng - seg1.lng;
    let bY = p.lat - seg1.lat;
    let dotProd = aX * bX + aY * bY;
    let sqDist = ax * aX + aY * aY;
    if (sqDist === 0) {
        return distance(p, seg1);
    }
    let component = dotProd / sqDist;
    let closest = {lat: 0, lng: 0)};
    if (component <= 0) {
        closest = seg1;
    } else if (component >= 1) {
        closest = seg2;
    } else {
        closest.lng = seg1.lng + aX * component;
        closest.lat = seg1.lat + aY * component;
    }
    return distance(p, closest);
}
```

The core of this algorithm is to define the probe and the segment as vectors. Then, using the dot product, the algorithm calculates the closest point to the probe on the line defined by the segment. If the point is inside the segment it returns the distance between that point and the probe, otherwise it returns the distance to the closest shape point of the segment.

After computing the lane distance for each of these segments, the algorithm may determine (e.g. choosing) the lowest one to be the actual lane distance for the probe.

Finally, the algorithm needs to determine which side of the link the probe is on, in order to choose the sign for the already computed lane distance. The probe distance on the one side (e.g. left side) of a road segment carries a positive sign. The algorithm may for instance use the previously mentioned dot product in the vector form: the sign of the dot product represents the side of the link the probe is on. Each probe on the link may be associated with a lane distance. The algorithm may for instance analyze the spatial distribution of the probes on the link based on the associated lane distance.

Each probe now has the two most important attributes needed by the algorithm: (i) the lane distance, and (ii) the traversal percentage.

The traversal percentage is a percentage that represent how far along the link the probe is, so if a probe is in the middle of the link, on whichever lane, the traversal percentage will be 0.5. The traversal percentage may for instance be automatically computed during the probe map-matching.

To produce the lateral movement metric, an ensemble of trips may for instance be analyzed. This ensemble may for instance either be historical or in real-lime, this choice will produce results with different meanings.

This ensemble may for instance be analyzed be using the following algorithm (shown in exemplary computer program code):

```
function lateralMetric( trips, linkLength ) {
    var movForward = 0;
    var movLateral = 0;
    for (trip in trips) {
        for ( var i in [1 .. trip.probes.size( )] ) {
            var travPctCurr = trip.probes[i].travPct;
            var travPctPrev = trip.probes[i-1].travPct;
            movForward += (travPctCurr - travPctPrev) * linkLength;
            var distCurr = trip.probes[i].laneDist;
            var distPrev = trip.probes[i-1].laneDist;
            movLateral += abs(distCurr - currPrev);
        }
    }
    return (movLateral / movForward);
}
```

The algorithm may for instance produce the metric for each link, the ratio approach may for instance allow it to be unaffected by shape or length of links.

Typical values for the SDM metric range from 0, for a link where everybody is driving perfectly straight, to values such as 1 or 2, for very chaotic links (e.g. the drivers changing lanes very frequently).

Autonomous driving vehicles may for instance use this metric in their routing algorithm, sacrificing the fastest route to take a less chaotic one, improving safety. Further, e.g. cities may for instance monitor the roads with very high SDM to identify areas where there are opportunities to improve road safety.

FIG. 9 illustrates an extreme example of high lateral movement (SDM=2).

For instance, in illustrations of map data comprising at least one link of at least one road segment, this metric can be visualized. The link may for instance be overlayed by a line e.g. of different color or different line style, e.g. red-color or a dotted line may be used for representing the extreme lateral movements, and green-color or a solid line may be used for representing no lateral movements or very few lateral movements.

An improved algorithm that is less prone to GPS errors and attempts to measure actual lane changes count on a road segment or link. The multi-modality detection and clustering (MDC) algorithm may for instance be used to automatically (at least partially) detect the structure of the VLP, which may for instance include: (i) the number of clusters (peaks) in the histogram; (ii) the size of the clusters; and/or (iii) the center of the clusters, which may for instance be used for calculating the lane distance of each cluster probe from the center line.

This is achieved using the lane distance metric for each raw probe, which is a measure of its distance from the center of the road. The set of distances must be obtained in reference to the direction of travel. For instance, the probes on the left side are marked to be on the negative x-axis while the probes on the right side are marked to be on the positive x-axis. Then the one-dimensional vector/array D containing all +/−d distance metric (d-values) for all the raw probes is of the form $$D \leftarrow \{-d_1, -d_2, \ldots, -d_m, \ldots, +d_1, +d_2, \ldots, d_n\};$$

wherein $d_i$=Dist(Position(Map−Match), Position(Raw)); m=total number of probes on the left side of the road (segment) and n=total number of probes on the right side.

$$|D| = m+n$$

D may for instance be converted to a linear positive vector or list V using the function:

$$V \leftarrow |\min(D)| + D$$

Then V becomes the input to the MDC algorithm as illustrated below (shown in exemplary computer program code):

```
V ← {alistofeachprobesdvalues}
functionMDC(V):
    s ← STD(V)
    m ← mean(V)
    V ← V∀V < m + 2s &V > m − 2s     // first outlier filtering
    d ← Range(V)/16
    for i ← 1to16         // bucketizing
        b_i ← {V∀V < max(V)&V > (max(V) − d)}
        V ← V − b_i
    end for
    V ← b_1 + b_2 + . . . + b_16      // restoreV
    C ← 1
    for i ← 2to16        //cluster search
        MG ← (mean(b_1) − mean(b_i)) / Range(V)
        if |b_1| > 8andMG > 0.3and| V − b_1 |> 8    // 8&0.3aretuning paramters
        then{
            MD ← {C, mean(b_1), size(b_1), STD(b_1), MG}
            C ← C + 1
            V ← V − b_1
            b_1 ← b_i
        }
        elseb_1 ← b_1 + b_i
        endif
    end for
    MD ← {C, mean(b_1), size(b_1), STD(b_1)}
    returnMD
endMDC
```

The MDC algorithm may for instance automatically detect the multi-modality and may for instance generate the number of clusters that relatively correspond to the number of lanes on the road segment. In this way, the average number of lanes vehicles traversed on a link or road segment may for instance be obtained (e.g. determined) and this metric may for instance be used as an indication of SDM.

FIGS. 10a to 10b show an implementation of this algorithm using real probe-data and visualizing the data using a scale: (i) one lane avg→solid line; (ii) two lanes avg→dashed or dash-dotted line; (iii) three lanes avg→dotted line The results obtained using real probe data is shown in FIGS. 10a to 10b. The count field is the total number of probes within the epoch used to generate the SDM.

FIG. 3 shows a summarized implementation flow of the algorithms and data from raw probe trajectory to generating the SDM. The days required for VLP may for instance range between two to seven days, in case the VLP is determined based on such historic probe data, e.g. obtained two to seven days ago for the respective road segment. The results shown in FIGS. 11a to 11c were obtained using two days of VLP data.

The flexible time epoch value in the new probes computed allows for the flexibility of producing an artifact of road segment with SDP data to a near real-time application that computes this metric and frequent time intervals. This dynamic and time dependent component of this invention makes it have diverse areas of applications in routing and navigation, incident management, insurance premiums and autonomous vehicles.

Further, also the following embodiments of the invention shall be considered to be disclosed:

Embodiment 1

An apparatus comprising at least one processor and at least one memory including computer program code, the at least one memory and the computer program code configured to, with the at least one processor, cause the apparatus to at least perform:
obtaining data associated with each road segment of at least one road segment, said data comprising:
a representative of at least one link associated with the respective road segment;
obtaining probe data associated with the respective road segment, the probe data comprising:
at least one piece of position information;
determining a sinuous driving metric, which is a value being indicative of a sinuosity of driving on the respective road segment based at least partially on the probe data and its allocation with respect to the respective road segment.

Embodiment 2

The apparatus according to embodiment 1, wherein a lane distance metric is determined based at least partially on the obtained data and the obtained probe data, wherein the lane distance metric indicates a measure of an average relative lateral movement of the at least one probe data associated with the at least one road segment.

Embodiment 3

The apparatus according to any of the embodiment 1 or 2, wherein the data comprises further a representative of a spatial metric associated with spatial properties associated with the respective road segment.

Embodiment 4

The apparatus according to any of the preceding embodiments, wherein the spatial metric indicates a measure of at least one trajectory associated with said respective road segment Embodiment 5

The apparatus according to any of the embodiments 3 or 4, wherein spatial properties associated with one of the following dimensions:
two dimensional; or
three dimensional.

Embodiment 6

The apparatus according to any of the embodiments 2 to 5, wherein the lane distance metric is determined based at least partially on a ratio between a lateral movement value and a forward movement value, wherein the lateral movement value and the forward movement value are determined based at least partially on the obtained data and the obtained probe data.

Embodiment 7

The apparatus according to any of the embodiments 2 to 6, wherein for determining the lane distance metric the obtained data and the obtained probe data are defined as vectors.

Embodiment 8

The apparatus according to any of the embodiments 2 to 7, wherein the lane distance metric comprises a road side value indicative of whether the at least one piece of position information is located on a first road side of the respective road segment or on a second road side of the respective road segment.

Embodiment 9

The apparatus according to any of the embodiments 7 or 8, wherein a dot product of the defined vectors is computed to determine whether the obtained probe data is associated with the first road side or the second road side of the respective road segment.

Embodiment 10

The apparatus according to any of the embodiments 2 to 9, wherein a traversal percentage of the probe data is determined based at least partially on a spatial distribution associated with the probe data with respect to the respective road segment and the determined lane distance metric.

Embodiment 11

The apparatus according to any of the embodiments 2 to 10, wherein a vehicle lane pattern metric is determined based at least partially on the determined lane distance metric, wherein the vehicle lane pattern metric is a value being indicative of a measure of an average number of lanes traversed associated with the respective road segment.

Embodiment 12

The apparatus according to embodiment 11, wherein the vehicle lane pattern metric is determined based at least partially on one or more pieces of historic probe data.

Embodiment 13

The apparatus according to embodiment 12, wherein the one or more pieces of historic probe data comprises one or more of the following:

i) at least one piece of position information;
ii) epoch time;
iii) epoch date
iv) spatial properties associated with two dimensional or three dimensional dimension.

Embodiment 14

The apparatus according to any of the embodiments 12 or 13, wherein the one or more pieces of historic probe data are used for determining the lane distance metric Embodiment 15

The apparatus according to any of the embodiments 11 to 14, wherein a number of clusters relatively corresponding to a number of lanes associated with the respective road segment is generated based at least partially on the determined lane distance metric, wherein the vehicle lane pattern metric is determined at least partially based on the respective number of clusters.

Embodiment 16

The apparatus according to any of the embodiments 11 to 15, wherein the sinuous driving metric is determined based at least partially on the vehicle lane pattern metric and probe data obtained over at least one time epoch period.

Embodiment 17

A method, in particular performed and/or controlled by at least one apparatus, the method comprising:
  obtaining data associated with each road segment of at least one road segment, said data comprising:
    a representative of at least one link associated with the respective road segment;
  obtaining probe data associated with the respective road segment, the probe data comprising:
    at least one piece of position information;
  determining a sinuous driving metric, which is a value being indicative of a sinuosity of driving on the respective road segment based at least partially on the probe data and its allocation with respect to the respective road segment.

Embodiment 18

The method according to embodiment 17, wherein a lane distance metric is determined based at least partially on the obtained data and the obtained probe data, wherein the lane distance metric indicates a measure of an average relative lateral movement of the at least one probe data associated with the at least one road segment.

Embodiment 19

The method according to any of the embodiment 17 or 18, wherein the data comprises further a representative of a spatial metric associated with spatial properties associated with the respective road segment.

Embodiment 20

The method according to any of the preceding embodiments, wherein the spatial metric indicates a measure of at least one trajectory associated with said respective road segment Embodiment 21

The method according to any of the embodiments 19 or 20, wherein spatial properties associated with one of the following dimensions:
two dimensional; or
three dimensional.

Embodiment 22

The method according to any of the embodiments 18 to 21, wherein the lane distance metric is determined based at least partially on a ratio between a lateral movement value and a forward movement value, wherein the lateral movement value and the forward movement value are determined based at least partially on the obtained data and the obtained probe data.

Embodiment 23

The method according to any of the embodiments 18 to 22, wherein for determining the lane distance metric the obtained data and the obtained probe data are defined as vectors.

Embodiment 24

The method according to any of the embodiments 18 to 23, wherein the lane distance metric comprises a road side value indicative of whether the at least one piece of position information is located on a first road side of the respective road segment or on a second road side of the respective road segment.

Embodiment 25

The method according to any of the embodiments 23 or 24, wherein a dot product of the defined vectors is computed to determine whether the obtained probe data is associated with the first road side or the second road side of the respective road segment.

Embodiment 26

The method according to any of the embodiments 18 to 25, wherein a traversal percentage of the probe data is determined based at least partially on a spatial distribution associated with the probe data with respect to the respective road segment and the determined lane distance metric.

Embodiment 27

The method according to any of the embodiments 18 to 26, wherein a vehicle lane pattern metric is determined based at least partially on the determined lane distance metric, wherein the vehicle lane pattern metric is a value being indicative of a measure of an average number of lanes traversed associated with the respective road segment.

Embodiment 28

The method according to embodiment 27, wherein the vehicle lane pattern metric is determined based at least partially on one or more pieces of historic probe data.

Embodiment 29

The method according to embodiment 28, wherein the one or more pieces of historic probe data comprises one or more of the following:
i) at least one piece of position information;
ii) epoch time;
iii) epoch date
iv) spatial properties associated with two dimensional or three dimensional dimension.

Embodiment 30

The method according to any of the embodiments 28 or 29, wherein the one or more pieces of historic probe data are used for determining the lane distance metric

Embodiment 31

The method according to any of the embodiments 27 to 30, wherein a number of clusters relatively corresponding to a number of lanes associated with the respective road segment is generated based at least partially on the determined lane distance metric, wherein the vehicle lane pattern metric is determined at least partially based on the respective number of clusters.

Embodiment 32

The method according to any of the embodiments 27 to 31, wherein the sinuous driving metric is determined based at least partially on the vehicle lane pattern metric and probe data obtained over at least one time epoch period.

Embodiment 33

An apparatus configured to perform and/or control or comprising respective means for performing and/or controlling the method of any of the embodiments 17 to 32.

Embodiment 34

A computer program code, the computer program code when executed by a processor causing an apparatus to perform the actions of the method according to any of the embodiments 17 to 32.

Embodiment 35

A computer readable storage medium in which computer program code according to the embodiment 34 is stored.

Embodiment 36

An apparatus comprising at least one processor and at least one memory including computer program code, the at least one memory and the computer program code configured to, with the at least one processor, cause an apparatus at least to perform and/or control the method of any of the embodiments 17 to 32.

Embodiment 37

The apparatus according to embodiment 36, wherein the apparatus is a mobile device or a part thereof, and, in particular, a part of an autonomous vehicle.

Embodiment 38

A system, comprising a first apparatus according to anyone of embodiments 1 to 16, and at least a second apparatus, wherein the second apparatus is configured to provide the at least one probe data to the first apparatus.

Embodiment 39

A system, comprising an apparatus according to any a anyone of embodiments 1 to 16, and an electronic device, wherein the electronic device is configured to gather one or more pieces of probe data.

Embodiment 40

The system according to embodiment 39, wherein the electronic device is configured to provide the at least one probe data to the apparatus.

Embodiment 41

A tangible computer-readable medium storing computer program code, the computer program code when executed by a processor causing an apparatus to perform and/or control:
- obtaining data associated with each road segment of at least one road segment, said data comprising:
- a representative of at least one link associated with the respective road segment;
- obtaining probe data associated with the respective road segment, the probe data comprising:
- at least one piece of position information;
- determining a sinuous driving metric, which is a value being indicative of a sinuosity of driving on the respective road segment based at least partially on the probe data and its allocation with respect to the respective road segment.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. An apparatus comprising at least one processor and at least one memory including computer program code, the at least one memory and the computer program code configured to, with the at least one processor, cause the apparatus to at least perform:
   obtaining data associated with each road segment of at least one road segment, said data comprising:
   a representative of at least one link associated with the respective road segment;
   obtaining probe data associated with the respective road segment, the probe data comprising:
   at least one piece of position information; and
   determining a sinuous driving metric, which is a value being indicative of a sinuosity of driving on the respective road segment as determined from lateral movement across the respective road segment at least some of which results in a change of lane and based at least partially on the probe data and its allocation with respect to the respective road segment.

2. The apparatus according to claim 1, wherein a lane distance metric is determined based at least partially on the obtained data and the obtained probe data, wherein the lane distance metric indicates a measure of an average relative lateral movement of the at least one probe data associated with the at least one road segment.

3. The apparatus according to claim 2, wherein the data comprises further a representative of a spatial metric associated with spatial properties associated with the respective road segment.

4. The apparatus according to claim 3, wherein the lane distance metric is determined based at least partially on a ratio between a lateral movement value and a forward movement value, wherein the lateral movement value and the forward movement value are determined based at least partially on the obtained data and the obtained probe data.

5. The apparatus according to claim 2, wherein the lane distance metric comprises a road side value indicative of whether the at least one piece of position information is located on a first road side of the respective road segment or on a second road side of the respective road segment.

6. The apparatus according to claim 3, wherein a traversal percentage of the probe data is determined based at least partially on a spatial distribution associated with the probe data with respect to the respective road segment and the determined lane distance metric.

7. The apparatus according to claim 2, wherein a vehicle lane pattern metric [is determined based at least partially on the determined lane distance metric, wherein the vehicle lane pattern metric is a value being indicative of a measure of an average number of lanes traversed associated with the respective road segment.

8. The apparatus according to claim 7, wherein the vehicle lane pattern metric is determined based at least partially on one or more pieces of historic probe data.

9. The apparatus according to claim 8, wherein a number of clusters relatively corresponding to a number of lanes associated with the respective road segment is generated based at least partially on the determined lane distance metric, wherein the vehicle lane pattern metric is determined at least partially based on the respective number of clusters.

10. The apparatus according to claim 7, wherein the sinuous driving metric is determined based at least partially on the vehicle lane pattern metric and probe data obtained over at least one time epoch period.

11. A method, comprising:
   obtaining data associated with each road segment of at least one road segment, said data comprising:
   a representative of at least one link associated with the respective road segment;
   obtaining probe data associated with the respective road segment, the probe data comprising:
   at least one piece of position information; and
   determining a sinuous driving metric, which is a value being indicative of a sinuosity of driving on the respective road segment as determined from lateral movement across the respective road segment at least some of which results in a change of lane and based at least partially on the probe data and its allocation with respect to the respective road segment.

12. The method according to claim 11, wherein a lane distance metric is determined based at least partially on the obtained data and the obtained probe data, wherein the lane distance metric indicates a measure of an average relative lateral movement of the at least one probe data associated with the at least one road segment.

13. The method according to claim 12, wherein the data comprises further a representative of a spatial metric associated with spatial properties associated with the respective road segment.

14. The method according to claim 13, wherein the lane distance metric is determined based at least partially on a ratio between a lateral movement value and a forward movement value, wherein the lateral movement value and the forward movement value are determined based at least partially on the obtained data and the obtained probe data.

15. The method according to claim 12, wherein the lane distance metric comprises a road side value indicative of whether the at least one piece of position information is located on a first road side of the respective road segment or on a second road side of the respective road segment.

16. The method according to claim 13, wherein a traversal percentage of the probe data is determined based at least partially on a spatial distribution associated with the probe data with respect to the respective road segment and the determined lane distance metric.

17. The method according to 12, wherein a vehicle lane pattern metric is determined based at least partially on the determined lane distance metric, wherein the vehicle lane pattern metric is a value being indicative of a measure of an average number of lanes traversed associated with the respective road segment.

18. The method according to claim 17, wherein the vehicle lane pattern metric is determined based at least partially on one or more pieces of historic probe data.

19. The method according to claim 18, wherein a number of clusters relatively corresponding to a number of lanes associated with the respective road segment is generated based at least partially on the determined lane distance metric, wherein the vehicle lane pattern metric is determined at least partially based on the respective number of clusters.

20. The method according to claim 17, wherein the sinuous driving metric is determined based at least partially on the vehicle lane pattern metric and probe data obtained over at least one time epoch period.

21. An apparatus comprising at least one processor and at least one memory including computer program code, the at least one memory and the computer program code configured to, with the at least one processor, cause the apparatus to at least perform:

obtaining data associated with each road segment of at least one road segment, said data comprising:
a representative of at least one link associated with the respective road segment;
obtaining probe data associated with the respective road segment, the probe data comprising:
at least one piece of position information;
determining a lane distance metric based at least partially on the obtained data and the obtained probe data, wherein the lane distance metric indicates a measure of an average relative lateral movement of the at least one probe data associated with the at least one road segment; and
determining a sinuous driving metric, which is a value being indicative of a sinuosity of driving on the respective road segment based at least partially on the probe data and its allocation with respect to the respective road segment.

22. A method, comprising:
obtaining data associated with each road segment of at least one road segment, said data comprising:
a representative of at least one link associated with the respective road segment;
obtaining probe data associated with the respective road segment, the probe data comprising:
at least one piece of position information;
determining a lane distance metric based at least partially on the obtained data and the obtained probe data, wherein the lane distance metric indicates a measure of an average relative lateral movement of the at least one probe data associated with the at least one road segment; and
determining a sinuous driving metric, which is a value being indicative of a sinuosity of driving on the respective road segment based at least partially on the probe data and its allocation with respect to the respective road segment.

* * * * *